United States Patent
Breitung

(10) Patent No.: US 7,006,753 B2
(45) Date of Patent: Feb. 28, 2006

(54) OPTICAL WAVEGUIDE DEVICES WITH DEUTERATED AMORPHOUS CARBON CORE STRUCTURES

(75) Inventor: Eric M. Breitung, Albany, NY (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 10/248,098

(22) Filed: Dec. 18, 2002

(65) Prior Publication Data

US 2004/0120685 A1   Jun. 24, 2004

(51) Int. Cl.
G02B 6/10 (2006.01)
(52) U.S. Cl. .................. 385/143; 385/129; 385/131; 385/142
(58) Field of Classification Search ........ 385/129–132, 385/141–145
See application file for complete search history.

(56) References Cited

U.S. PATENT DOCUMENTS

| 4,138,194 | A | * | 2/1979 | Beasley et al. ............. 385/143 |
| RE31,868 | E | * | 4/1985 | Beasley et al. ............. 385/143 |
| 4,615,584 | A | * | 10/1986 | Ohmori et al. ............. 385/143 |
| 4,779,954 | A | * | 10/1988 | Tatsukami et al. .......... 385/143 |
| 5,062,680 | A | * | 11/1991 | Imamura et al. ............ 385/131 |
| 6,438,304 | B1 | | 8/2002 | Lawrence et al. ........... 385/123 |
| 2002/0027126 | A1 | | 3/2002 | Alibert et al. ............. 216/24 |
| 2002/0092824 | A1 | | 7/2002 | Sun et al. ................. 216/24 |
| 2002/0164547 | A1 | | 11/2002 | Ferm et al. ................ 430/321 |
| 2002/0172488 | A1 | | 11/2002 | Morikawa et al. ........... 385/13 |

FOREIGN PATENT DOCUMENTS

WO  WO 01/64594 A1  9/2001
WO  WO 02/48429 A1  6/2002

OTHER PUBLICATIONS

JP 9197148. Publication Date: Jul. 31, 1997. Abstract Only. 1 Page.
"Technical background on planar optical waveguide technology developed at IBM's Zurich Research Laboratory" IBM Zurich Research Laboratory, News: Factsheet Zurich Optical Chip Technology to be . . . pp. 1-3.
Martin Hoffmann, et al., "Low-Loss Fiber-Matched Low-Temperature PECVD Waveguides with Small-Core Dimensions for Optical Communication Systems", IEEE photonics Technology Letters, vol. 9, No. 9, pp. 1238-1240. Sep. 1997.

* cited by examiner

Primary Examiner—Michelle Connelly-Cushwa
(74) Attorney, Agent, or Firm—Cantor Colburn LLP

(57) ABSTRACT

An optical waveguide device comprising a core structure formed of deuterated amorphous carbon. The optical waveguide device decreases losses due to hydrogen absorption. A process for making the optical waveguide device is also disclosed.

9 Claims, 2 Drawing Sheets

OPTICAL WAVEGUIDE DEVICES WITH DEUTERATED AMORPHOUS CARBON CORE STRUCTURES

BACKGROUND

The present disclosure relates to optical waveguide devices made from deuterated amorphous carbon, to a process for the preparation of the optical waveguide device, and to its use.

High-bandwidth communications generally rely on optical fibers and optical components for signal enhancement, and signal-routing as well as for adding and dropping information. The requirement for high capacity communication systems has led to the use of optical waveguides. The operation of optical waveguides is based on the fact that when a medium which is transparent to light is surrounded or otherwise bounded by another medium having a lower refractive index, light introduced along the inner medium's axis is highly reflected at the boundary with the surrounding medium, thus producing a guiding effect.

An optical waveguide generally consists of a core made of a high-refractive index material and a cladding of a low-refractive-index material surrounding the core. In traditional optical waveguide technology, the core and cladding are made of doped silica glass, where the refractive index contrast, i.e., the difference of the refractive index of the core layer relative to the cladding layers, is achieved by a doping profile, e.g., using P-doping or Ge-doping.

Planar waveguides are typically comprised of layers of low loss optical materials of precise indices of refraction. Both step index and gradient index waveguide structures are known in the art. For planar polymer and glass waveguides, in particular, step index structures are most easily achieved through successive coating of materials with differing indices of refraction. Typically, a waveguide core has a refractive index that is 0.3% to 2% higher than a cladding material. The magnitude of this refractive index difference ($\Delta n$) is set to optimize the performance of the planar waveguide or to match light modes when the transition is made from the planar device to an optical fiber. A higher refractive index contrast generally provides lower absorption losses.

A typical technique for fabricating the core structure of an optical waveguide device is by means of a plasma enhanced chemical vapor deposition (PECVD) process. The PECVD process utilizes gaseous precursors for depositing the desired materials. For deposition of silicon dioxide, the precursor gases typically include silane and nitrous oxide. For deposition of silicon oxynitride, the precursor gases typically include silane, nitrous oxide, and ammonia. The resulting core structures from these materials, however, have a large hydrogen concentration incorporated in the form of Si—H groups and/or N—H groups (in the case of silicon oxynitride). These groups and fragments introduce additional absorption into the optical transmission. For example, the first overtone of the Si—H induced absorption lies at about 1510 nanometers (nm), which overlaps with the spectral window that is commonly used for optical signal transmission. The first overtone of the N—H and the second overtone of the Si—H bond cause losses around 1,500 nm wavelength. The spectral window that is commonly used for optical signal transmission extends from about 1,540 nm to about 1,570 nm, hereinafter simply referred to as the desired optical transmission window. This window has been chosen for optical transmission due to the low costs associated with fabrication of lasers at these wavelengths, that the optical transmission losses for silicon dioxide based waveguides are minimal around 1,550 nm (due to purity of fabrication), and that for all-optical amplifiers in fiber networks (avoiding electrical-optical conversions) the only currently available amplifiers are based on erbium-doping.

Plasma-enhanced chemical vapor deposition (PECVD) techniques allow for optical processing elements to be directly incorporated on a substrate. During PECVD, gaseous precursors are exposed to plasma to form fragments and elements of the gaseous precursors, which are then deposited onto the substrate. A significant advantage of PECVD processes is that lower temperatures can be employed relative to conventional CVD processes. However, there can be significant tradeoffs to using PECVD techniques, including those adapted for low temperature operation. In conventional PECVD techniques, nitrous oxides and silane are typically utilized for deposition of silicon oxide. Unfortunately, as previously noted, such elements often result in a material having a high level of hydrogen absorption at wavelengths around 1,500 to 1,600 nanometers. In order to remove the chemical constituents that give rise to this loss, it may be necessary to heat (i.e. anneal) the deposited material to higher temperatures, thereby eliminating the advantages provided by the low temperature deposition process.

The losses are reduced to lower values by higher anneal temperatures or longer anneal durations, but both routes bear the risk of introducing unwanted defect-scattering or crystallization of the amorphous materials. A further negative side effect of the high-temperature annealing is the introduction of anisotropic stress, caused by the difference in thermal expansion coefficients between the silicon substrate and the material of the waveguide. The stress correlates with the temperature difference between room temperature and the highest annealing temperature or a material-specific temperature close to its annealing point, whichever is lower. The stress gives rise to birefringence and polarization-dependent transmission characteristics and is not desired for most applications.

BRIEF SUMMARY

Disclosed herein is an optical waveguide device comprising a core structure of a deuterated amorphous carbon material and a cladding about the core structure. The optical waveguide device exhibits low absorption losses at wavelengths between about 1,500 nm to about 1,600 nm.

A method of fabricating an optical waveguide device comprises depositing a deuterated amorphous carbon waveguide layer from a deuterated carbon precursor onto a substrate by a plasma enhanced chemical vapor deposition process; patterning the waveguide layer to provide a deuterated amorphous carbon core structure; and depositing a cladding material onto core structure, wherein the cladding material has a refractive index less than the deuterated carbon layer.

In one embodiment, a method of fabricating an optical waveguide device comprises oxidizing a silicon wafer to a defined thickness; depositing a deuterated amorphous carbon waveguide layer from a deuterated carbon precursor onto the oxidized silicon wafer by a plasma enhanced chemical vapor deposition process; lithographically patterning and directionally etching the deuterated amorphous carbon waveguide layer to form a deuterated amorphous carbon core structure; and depositing a cladding material having a refractive index less than the deuterated carbon layer.

The above described and other features are exemplified by the following detailed description and figures.

DETAILED DESCRIPTION

The present disclosure relates to optical waveguide devices for use in optical transmission. The optical waveguide device generally comprises a core material and a cladding material disposed about the core material, wherein the core material has a refractive index greater than the cladding material. In a preferred embodiment, the core material is a deuterated or perdeuterated amorphous carbon material. As used herein, the term "deuterated" is intended to refer to both partially and completely deuterated materials. Although partially deuterated materials can be utilized, it is more preferred that the material is perdeuterated, i.e., completely deuterated. The term "amorphous" refers to a material exhibiting non-crystalline properties, i.e., the material is devoid of crystallinity.

Figure 1:
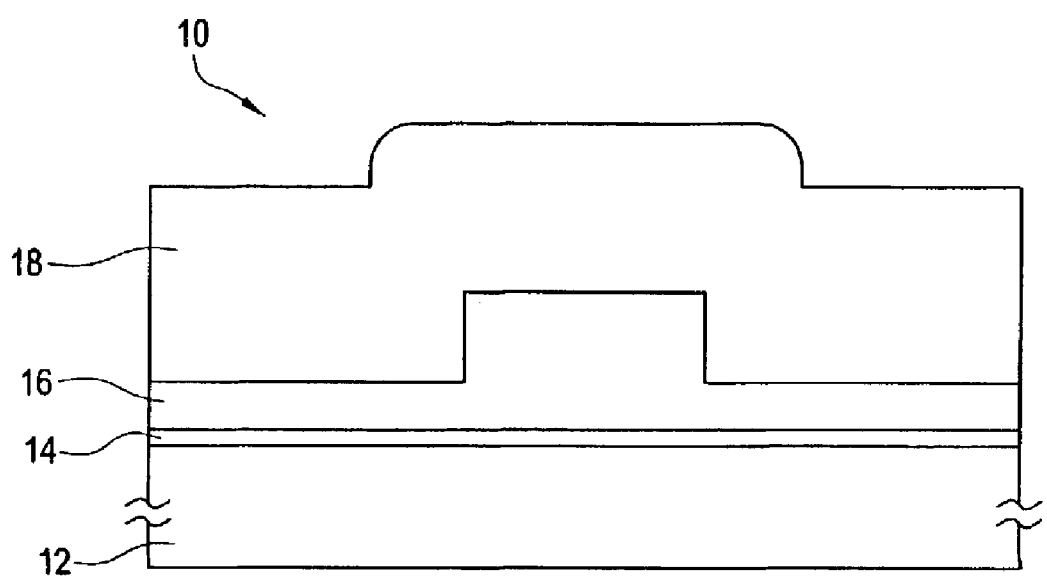
FIG. 1 is a cross section of an optical waveguide device.
Figure 2:
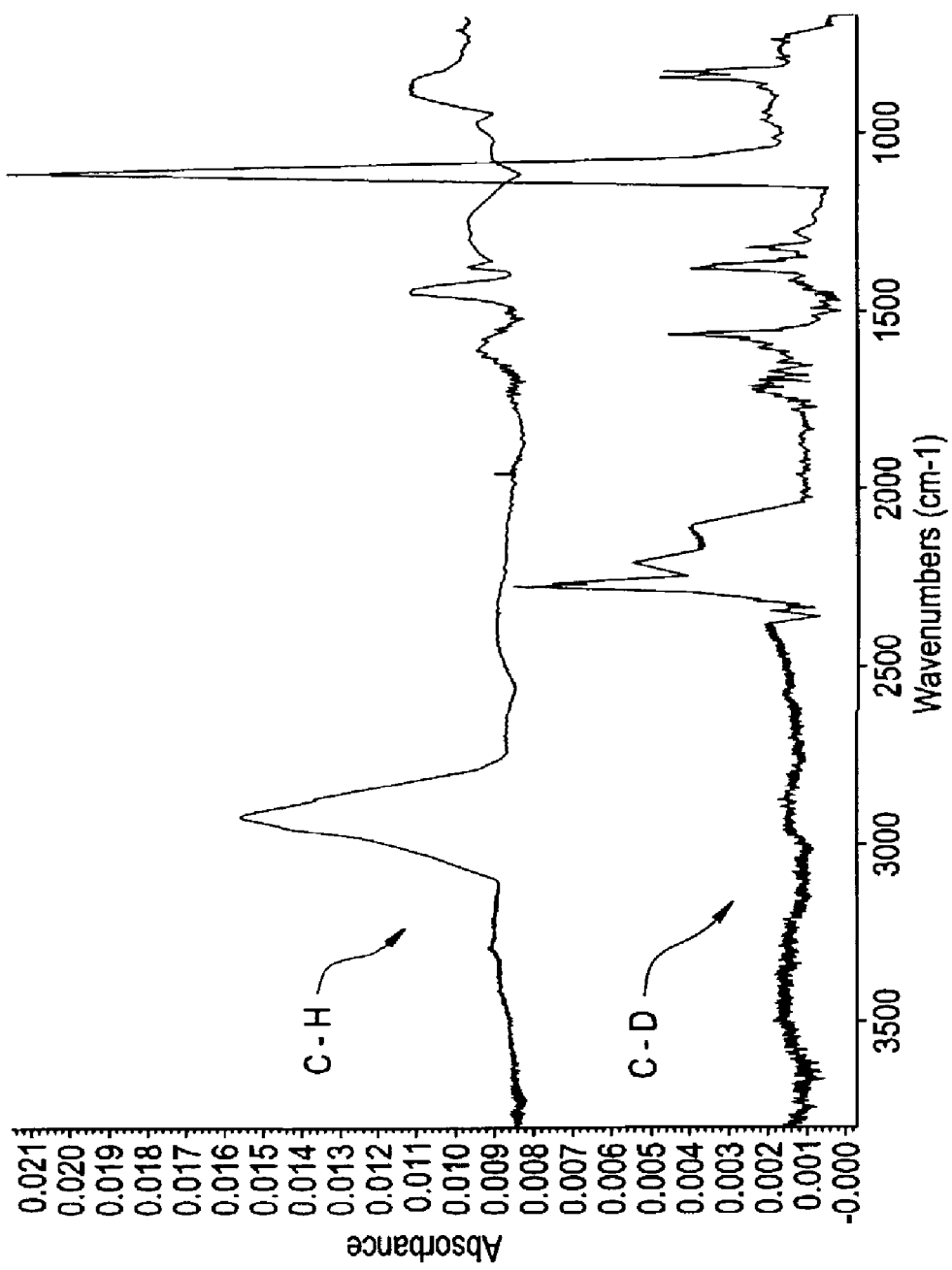
FIG. 2 is a spectrum showing the C—H absorption band of a hydrogenated amorphous carbon material as compared to a deuterated amorphous C—D material.

Referring now to FIG. 1, there is an exemplary optical waveguide device generally designated 10. The optical waveguide device 10 includes a substrate 12 upon which a core structure 16 and cladding layers 14, 18 are formed. The core structure 16 is sandwiched between cladding layers 14, 18, wherein the core structure 16 is fabricated from a material that has a higher refractive index than the material utilized for the cladding layers 14, 18. The cladding layers include a lower cladding layer 14 and an upper cladding layer 18. The core structure 16 is preferably formed of a deuterated amorphous carbon material. Advantageously, the use of the deuterated amorphous carbon material provides the optical waveguide device 10 with a reduction in the absorption of infrared energy below about 4 microns and between about 8 to about 12 microns. More particularly, the use of the deuterated carbon material decreases absorptions in light transmissions at about 1,500 to about 1,600 nanometers since the overtones associated with carbon-hydrogen (C—H) bonding of, for example, hydrogenated amorphous carbon at about 3.3 microns are replaced with carbon-deuterium (C-D) bonds. The C-D bonds absorb higher energy wavelengths of light, which no longer interfere with transmitted light of about 1,500 nanometers to about 1,600 nanometers, which are the desired wavelengths for infrared (IR) optical waveguide devices. FIG. 2 illustrates a spectrum showing the C—H absorption band of a hydrogenated amorphous carbon material as compared to a deuterated amorphous C-D material. By use of a deuterated amorphous carbon core structure, optical waveguide devices can be fabricated which exhibit low loss light transmission at these wavelengths, which are considered to be the accepted standard for optical telecommunication frequencies.

In a preferred embodiment, a deuterated amorphous carbon material is deposited onto the substrate 12 by plasma enhanced chemical vapor deposition (PECVD) at temperatures less than about 300° C., with temperatures less than about 200° C. more preferred, and with temperatures less than about 100° C. even more preferred. The PECVD process utilizes volatile deuterated hydrocarbon precursors such as deuterated alkanes, e.g., $CD_4$ and aromatic compounds e.g., $C_6 D_6$. Any deuterated hydrocarbon can be employed as well as mixtures thereof.

The refractive index of the deuterated amorphous carbon core structure 16 formed from the deuterated carbon precursors is preferably about 1.5 to about 1.9 measured at 1550 nanometers, and with a refractive index equal to or greater than about 1.6 to about 1.8 percent more preferred. Also, it is preferred that the refractive index of the core structure 16 is equal to or greater than about 0.1% percent to about 20 percent relative to the material utilized for cladding layers 14, 18.

The cladding layers 14, 18 are formed of optically transparent materials that have a lower index of refraction than the deuterated amorphous carbon core structure 16. Suitable materials include, but are not intended to be limited to, silicon dioxide ($SiO_2$), doped silicon dioxide, polymers, interpolymers, and the like. Examples of suitable dopants for the doped silicon dioxide include, but are not intended to be limited to, $P_2O_5$, $B_2O_3$, $GeO_2$, and $TiO_2$. The total dopant level is typically between about 1 to about 20 weight percent. Exemplary polymers and interpolymers include vinyl fluoride, vinylidene fluoride, tetrafluoroethylene, hexafluoropropylene, trifluoromethyltrifluorovinyl ether, perfluorpropyltrifluorovinyl ether, fluorinated esters or acrylic and methacrylic acids, and the like. Cladding materials that are amorphous are preferred since waveguides clad with a crystalline material are known to have higher attenuations of transmitted light than those coated with an amorphous material. Depending on the particular application, the upper cladding layer may be fabricated from a material different from the material used for the lower cladding layer. In a preferred embodiment, the cladding layers 14, 18 are fabricated from amorphous doped or pure $SiO_2$.

The cladding layers 14, 18 may be formed by chemical vapor deposition (CVD), by thermal oxidation, or the like. Since the cladding layers 14, 18 reflect light traveling through the core structure 16; the thickness of the cladding layers is generally not critical, so long as its thickness is at least a few wavelengths of the light to be transmitted. Preferably, the thicknesses of the cladding layers 14, 18 are between about 2 to about 100 micrometers, with a thickness of about 2 to about 50 micrometers more preferred, and with a thickness of about 2 to about 20 micrometers most preferred. If the substrate 12 is quartz glass or fused silica, the substrate 12 itself may act as the lower cladding layer 14. The upper cladding layer 18 substantially covers the core structure 16. In a preferred embodiment, the upper and lower cladding layers 14, 18 are formed of the same material.

The cladding layers 14, 18 preferably have an index of refraction of at least about 0.1 percent lower than that of the deuterated amorphous carbon core structure, preferably at least 1 percent lower, and most preferably at least 5 percent lower. The refractive index contrast difference between the deuterated carbon core and the cladding layers 14, 18 facilitate low-loss bending radii as small as about 5 to about 10 millimeters. The narrow curvatures advantageously enable compact design of optical waveguide devices consisting of many bent structures required for functions such as waveguide (de)multiplexers and filters based on resonant couplers.

The substrate 12 can be any substrate used in waveguide applications including but not limited to plastics, inorganic substrates, and the like. For example, the substrate can be a silicon-based material, such as Si, $SiO_2$, doped-$SiO_2$, SiON, and the like, or $Ta_2O_5$. Other substrates will become apparent to those of ordinary skill in the art given the present description. The substrate 12 can be of various geometrical shapes, such as rectangular, trapezoidal, circular or the like. In a preferred embodiment, the waveguides are preferably fabricated on silicon wafers covered with an oxide layer. Preferably, the substrate layer 12 is a SiO$_2$ substrate of circular shape, having a 100 millimeter diameter, and a thickness of between about 0.5 to about 2 mm.

In fabricating the optical waveguide device 10, the following layers are deposited onto the substrate, e.g., silicon, using a PECVD process. For exemplary purposes, the substrate is placed in a 13.56 MHz single wafer parallel plate reactor to perform the PECVD process. Batch reactors are also contemplated herein. In a first step, a suitable deuterated hydrocarbon gas or gases are fed into the reactor such that a deuterated amorphous carbon coating is deposited onto a surface of the substrate. Then, the core layer of the deuterated coating is structured using standard lithography and etching techniques. In the lithographic and etching processes, a photoresist is first coated onto the core layer. A photomask having a desired waveguide pattern is positioned above the photoresist layer and is imagewise exposed with activating energy to form a latent image of the waveguide pattern in the photoresist layer. Subsequent development with a suitable developer forms a relief image of the waveguide pattern in the photoresist layer. A directional etching process follows to pattern the core structure. Suitable directional etching processes include reactive ion etching, ion beam etching, and the like. The residual photoresist is then removed using a suitable dry (e.g., plasma ashing) or wet cleaning process, and thereafter, a cladding layer is deposited. The cladding layer may be deposited using the PECVD process, for example, by reacting silane and nitrous oxide precursor gases in the reactor to form a silicon dioxide layer on the core structure. As previously discussed, the silicon dioxide layer may be doped to provide a desired refractive index. Alternatively, in the case of polymers, the cladding may be applied to the core structure by various methods such as by solvent coating. The devices are then separated and the end faces are prepared by cutting the substrate with a dicing saw. The end face of an exemplary waveguide is shown in FIG. 1.

The loss values for the optical waveguide devices are preferably equal to or less than 1 decibels per centimeter (dB/cm), with a loss value equal to or less than 0.5 dB/cm more preferred, and with a loss value equal to or less than 0.05 dB/cm even more preferred.

The following examples are provided to illustrate some embodiments of the present disclosure. They are not intended to limit the disclosure in any aspect.

EXAMPLE 1

In this example, a silicon layer with an oxide lower cladding layer was provided. A core layer of amorphous deuterated carbon was deposited in a parallel plate PECVD reactor to a thickness of 2 micrometers. The reactor included flowing deuterated benzene at a flow rate of 25 standard cubic centimeters per minute (sccm) for 40 minutes at a pressure of 100 mTorr in the PE mode at 40 Watts. The substrate was heated to 100° C. during deposition of the core layer. No patterning was done, and air was used as the upper cladding layer. The coated wafer was shown to guide light at 1,534 nm by coupling the light into the layer using prisms.

The loss value for the waveguide at 1,550 nm was 1.0 decibel per centimeter (dB/cm).

Advantageously, the use of deuterated amorphous carbon provides an ultra-low loss material with a wide optical bandwidth.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An optical waveguide device comprising a core structure of a deuterated amorphous carbon material and a cladding material about the core structure, wherein the deuterated amorphous carbon material is not polymeric and consists of carbon, deuterium, and hydrogen.

2. The optical waveguide device according to claim 1, wherein the cladding material comprises an upper cladding layer and a lower cladding layer.

3. The optical waveguide device according to claim 1, wherein the cladding material comprises a material having a refractive index lower than the deuterated carbon material.

4. The optical waveguide device according to claim 1, wherein the deuterated amorphous carbon material has a refractive index of about 1.5 to about 1.9 as measured at 1,550 nanometers.

5. The optical waveguide device according to claim 1, wherein the deuterated amorphous carbon material is perdeuterated.

6. The optical waveguide device according to claim 5, wherein the substrate comprises a plastic or an inorganic material.

7. The optical waveguide device according to claim 1, wherein the deuterated amorphous carbon material and the cladding layer have a refractive index contrast of at least about 0.1 percent, wherein the deuterated amorphous carbon material has a higher refractive index than the cladding layer.

8. The optical waveguide device according to claim 1, further comprising a substrate upon which the cladding layer and the core structure are formed.

9. The optical waveguide device according to claim 1, wherein cladding material comprises silicon dioxide, doped silicon dioxide, polymers, or interpolymers.

* * * * *